(12) United States Patent
Noh et al.

(10) Patent No.: US 8,503,827 B2
(45) Date of Patent: Aug. 6, 2013

(54) APPARATUS AND METHOD FOR DECODING IMAGE DATA

(75) Inventors: Kyung-heon Noh, Suwon-si (KR); Sun-cheol Kwon, Yongin-si (KR); Seh-woong Jeong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 842 days.

(21) Appl. No.: 12/540,624

(22) Filed: Aug. 13, 2009

(65) Prior Publication Data

US 2010/0040299 A1 Feb. 18, 2010

(30) Foreign Application Priority Data

Aug. 14, 2008 (KR) ........................ 10-2008-0079927

(51) Int. Cl.
*G06K 9/32* (2006.01)
*G06K 9/36* (2006.01)
*G06K 9/46* (2006.01)

(52) U.S. Cl.
USPC ........... 382/298; 382/233; 382/234; 382/246; 382/300

(58) Field of Classification Search
USPC .................. 382/232–253, 298–300
See application file for complete search history.

(56) References Cited

U.S. PATENT DOCUMENTS

| | | | |
|---|---|---|---|
| 2003/0222998 A1* | 12/2003 | Yamauchi et al. | 348/262 |
| 2004/0032968 A1* | 2/2004 | Andrew et al. | 382/100 |
| 2005/0058355 A1* | 3/2005 | Mitchell et al. | 382/233 |
| 2005/0175251 A1* | 8/2005 | Taketa et al. | 382/248 |
| 2006/0267809 A1 | 11/2006 | Ogasawara et al. | |
| 2007/0242890 A1* | 10/2007 | Wen et al. | 382/233 |
| 2008/0205777 A1 | 8/2008 | Chung | |

FOREIGN PATENT DOCUMENTS

| | | |
|---|---|---|
| JP | 200801224 A | 1/2008 |
| KR | 100839504 A1 | 6/2008 |

* cited by examiner

*Primary Examiner* — Amir Alavi
*Assistant Examiner* — Kenny Cese
(74) *Attorney, Agent, or Firm* — Volentine & Whitt, PLLC

(57) ABSTRACT

An image processing device includes: a controller configured to receive information for displaying at least a portion of an image, and in response thereto to generate a scale ratio K for scaling compressed image data corresponding to the image; a partial image decoder configured to receive the compressed image data and the scale ratio and in response thereto to decode and scale the compressed image data by the scale ratio K and to output a portion of the decoded and scaled image data, wherein the portion corresponds to an area of the image to be displayed on a display device; a frame buffer configured to store the portion of the decoded and scaled image data output by the partial image decoder; and a video processor configured to receive the data from the frame buffer and to further scale the data for display on the display device.

18 Claims, 15 Drawing Sheets

APPARATUS AND METHOD FOR DECODING IMAGE DATA

CROSS-REFERENCES TO RELATED APPLICATIONS

This application claims priority under 35 U.S.C. §119 from Korean Patent Application 10-2008-0079927, filed on 14 Aug. 2008 in the names of KyungHeon Noh et al., the entirety of which is hereby incorporated by reference for all purposes as if fully set forth herein.

BACKGROUND AND SUMMARY

1. Field

This invention pertains to the field of image processing, and more particularly, to method and decoding image data.

2. Description

Data representing an image is often encoded to reduce the memory storage requirements for storing the image data and/or the bandwidth requirements for communicating the image. A number of standards have been developed for image encoding. Probably the most common standard is the standard created by the Joint Photographic Experts Group (JPEG). JPEG is a commonly used method of compression for photographic images. The degree of compression can be adjusted, allowing a selectable tradeoff between storage size and image quality. JPEG typically achieves 10:1 compression with little perceptible loss in image quality. JPEG compression is used in a number of image file formats. JPEG/Exif is the most common image format used by digital cameras and other photographic image capture devices; along with JPEG/JFIF, it is the most common format for storing and transmitting photographic images on the World Wide Web. These format variations are often not distinguished, and are all simply called JPEG.

In a typical implementation, the original image data is split into three channels (Y, Cb and Cr) and, after downsampling, each channel is processed separately by splitting the data of each channel into blocks of N×N (e.g., 8×8) pixels (sometimes called minimum coded units (MCUs)), performing a Discrete Cosine Transform (DCT) on each block of pixels, quantizing the DCT coefficients according to a quantization matrix, and entropy encoding the quantized DCT coefficients, including Huffman coding. JPEG encoding and decoding are well known in the art, and so for brevity further details will not be presented here. In some cases, coded image data (e.g., JPEG coded image data) having a first pixel resolution must be scaled for display on a target display device having a different pixel resolution. Also, in some cases it is desired to "zoom" into a portion of the image and display the zoomed portion of the image on a display device.

FIG. 1 illustrates an arrangement 100 for decoding and scaling a JPEG image for display. FIG. 1 shows a source 110 of coded image data, a JPEG decoder 120, a first memory 130, a scaler 140, a second memory 150, and a display device 160.

A description will now be provided of an example of a process of decoding and resizing image data for display on a display device having a particular pixel resolution. In this example, assume that source 110 provides an original, high quality encoded image having a pixel resolution of 4000×3000 pixels, and this encoded image is decoded by JPEG decoder 120 and stored to first memory 130. Scaler 140 scales the image data in first memory 130 to be adapted to the resolution of display device 160, and stores the scaled data in second memory 150.

In this example, first memory 130 must be of a sufficient size to store the decoded image, and this may require up to 18 Mbytes of memory. In general, as the quality and pixel resolution of the encoded source image are increased, the size of first memory 130 must be increased.

Meanwhile, in the process of zooming an image for display, generally one of two methods in used.

The first method scale ups the image with an interpolation method for the display size. This provides a fast zoom capability, but leads to a poor quality display because if a high resolution and high quality image is enlarged during a display process, then the image quality is degraded.

The second method decodes the image to have a bigger size than the display size, and displays that image for high quality with a special zoom ratio. However, with this method a new decoding process is required that also has a longer processing time and requires more memory capacity. And although there is nearly no downgrade of image quality in a low ratio zooming process with this method, there is a downgrade of image quality in a high ratio zooming process.

Accordingly, it would be desirable to provide a new decoding method that can address one or more of these shortcomings. It would be further desirable to provide a system that can execute such a decoding method.

The present invention is directed to a method and system for decoding image data.

In one aspect of the inventive concept, a device comprises: a controller configured to receive information for displaying at least a portion of an image, and in response thereto to generate a scale ratio K for scaling compressed image data corresponding to the image; a partial image decoder configured to receive the compressed image data and the scale ratio and in response thereto to decode and scale the compressed image data by the scale ratio K and to output a portion of the decoded and scaled image data, wherein the portion corresponds to an area of the image to be displayed on a display device; a frame buffer configured to store the portion of the decoded and scaled image data output by the partial image decoder; and a video processor configured to receive the data from the frame buffer and to further scale the data for display on the display device.

In another aspect of the inventive concept, a method comprising: receiving information for displaying at least a portion of an image, and in response thereto, generating a scale ratio K for scaling compressed image data corresponding to the image; partially decoding the compressed image data; fully decoding at least a portion of the partially decoded image data, wherein the portion corresponds to an area of the image to displayed on a display device; scaling the fully decoded image data by the scale ratio k; writing the portion of the decoded and scaled image data into a frame buffer; and video processing the data from the frame buffer and to further scale the data for display on the display device.

In yet another aspect of the inventive concept, a method comprising: receiving information for displaying at least a portion of an image, including information identifying a zoom function to be performed on the image; determining a zoomed area of the image to be displayed and a zoom ratio for the image; generating a scale ratio K, based on the zoom ratio, for scaling compressed image data corresponding to the image; partially decoding the compressed image data; fully decoding at least a portion of the partially decoded image data, wherein the portion corresponds to the zoomed area; scaling the fully decoded image data by the scale ratio K; writing the portion of the decoded and scaled image data into a frame buffer; and video processing the data from the frame buffer to further scale the data for display on the display device.

In still another aspect of the inventive concept, a method comprises: receiving information for displaying at least a portion of an image, including information identifying a zoom function to be performed on the image; determining a zoomed area of the image to be displayed and a zoom ratio for the image; generating a scale ratio K, based on the zoom ratio, for scaling compressed image data corresponding to the image; (a) partially decoding the compressed image data; (b) fully decoding at least a portion of the partially decoded image data, wherein the portion corresponds to the zoomed area; (c) scaling the fully decoded image data by the scale ratio K; (d) writing the portion of the decoded and scaled image data into a first frame buffer; further comprising, until step (d) is completed for the entire image, in parallel with steps (a)-(d):(e) storing fully decoded image data for the entire image in a second frame buffer; (f) scaling-up the fully decoded image data of the second frame buffer by interpolation, and (g) displaying the scaled-up image data, and when step (d) is completed for the entire image, stopping displaying the scaled-up image data from the second frame buffer, and instead displaying the decoded and scaled image data from the first frame buffer.

In a further aspect of the inventive concept, a method comprises: receiving information for displaying at least a portion of an image, including information identifying a zoom function to be performed on the image; determining a zoomed area of the image to be displayed and a zoom ratio m for the image; generating a scale ratio K, based on the zoom ratio m, for scaling compressed image data corresponding to the image; (a) partially decoding the compressed image data; (b) fully decoding at least a portion of the partially decoded image data, wherein the portion corresponds to the zoomed area; (c) scaling the fully decoded image data by the scale ratio K; (d) writing the portion of the decoded and scaled image data into a first frame buffer; further comprising, until step (d) is completed for the entire image, in parallel with steps (a)-(d): (e) storing fully decoded image data for the entire image in a second frame buffer; (f) scaling-up the fully decoded image data of the second frame buffer by interpolation using a zoom ratio m0, wherein initially m0<m, and (g) displaying the scaled-up image data, (h) determining whether m0<m, and when m0<m: (i) incrementing the zoom ratio m0 by $\Delta$ m, (j) waiting a wait time, and (k) repeating steps (f)-(h); and when step (d) is completed for the entire image and m0>m, stopping displaying the scaled-up image data from the second frame buffer, and instead displaying the decoded and scaled image data from the first frame buffer.

BRIEF DESCRIPTION OF THE DRAWINGS

FIGS. 8A-B illustrate elements of a minimum coded unit (MCU) block that are selected according to a value of a scaling factor.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 2:
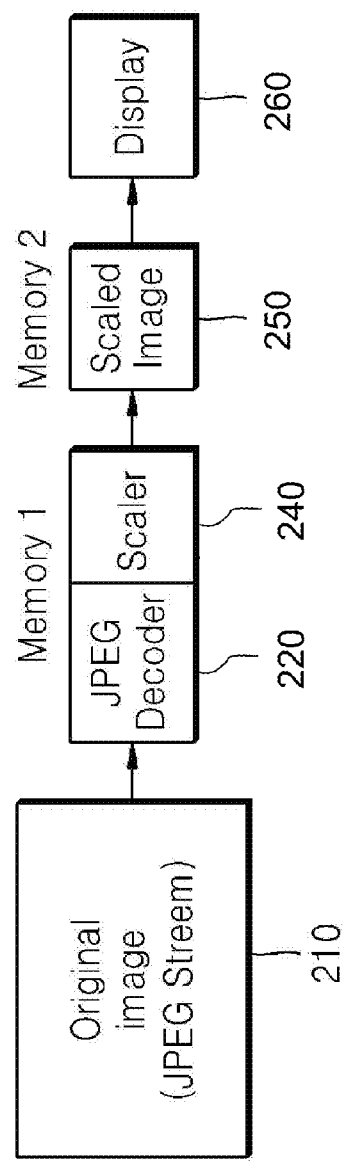
FIG. 2 illustrates one exemplary embodiment of an arrangement for decoding and scaling a JPEG image for display.

FIG. 2 illustrates one exemplary embodiment of an arrangement 200 for decoding and scaling a JPEG image for display. FIG. 2 shows a source 210 of coded image data, a JPEG decoder 220 provided with a scaler 240, a memory 250, and a display device 260.

In the arrangement of FIG. 2, JPEG decoder 220 is coupled with scaler 240 for performing a scaling process together with a decoding process. The source image is decoded and scaled in JPEG decoder & scaler 220/240 and stored in a first memory (not shown). Then, an image that is scaled to fit display device 260) is stored in the (second) memory 250.

Figure 1:
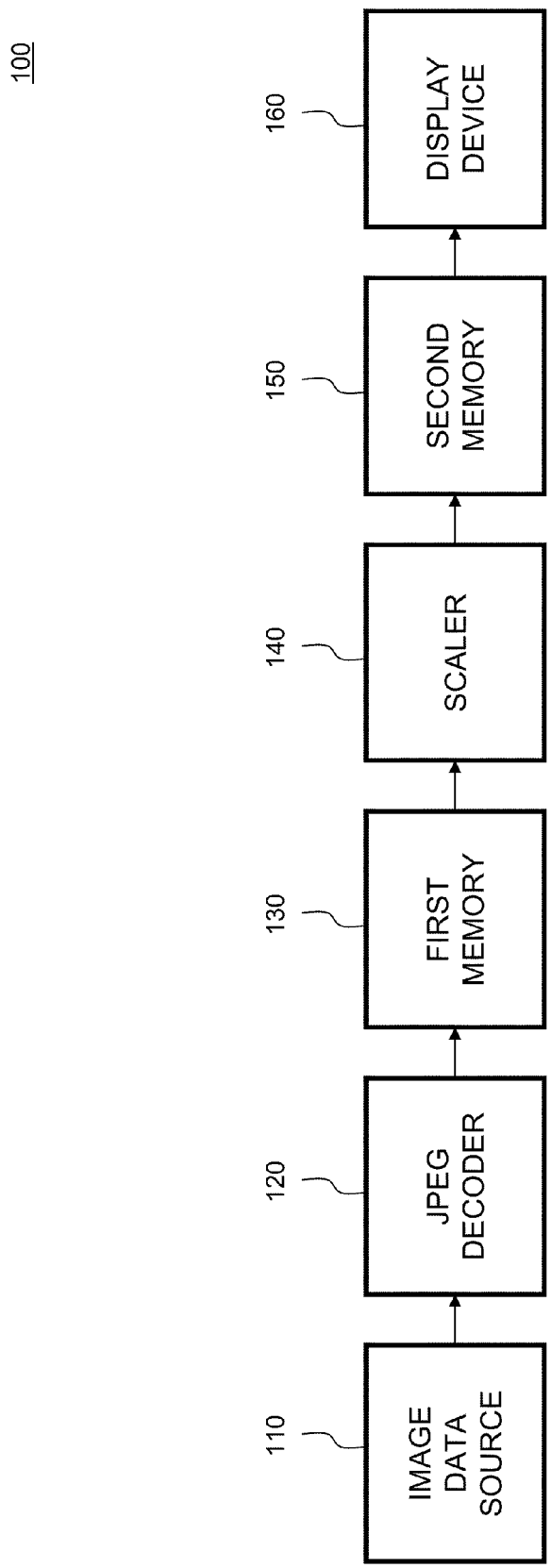
FIG. 1 illustrates an arrangement for decoding and scaling a JPEG image for display.

In this method, the amount of memory required is less than the in arrangement 100 shown in FIG. 1. However, when performing a zoom operation on the source image for display on display device 260, the image data quality is downgraded because an interpolation operation is executed on the data stored in the first memory and the image is enlarged.

Figure 3:
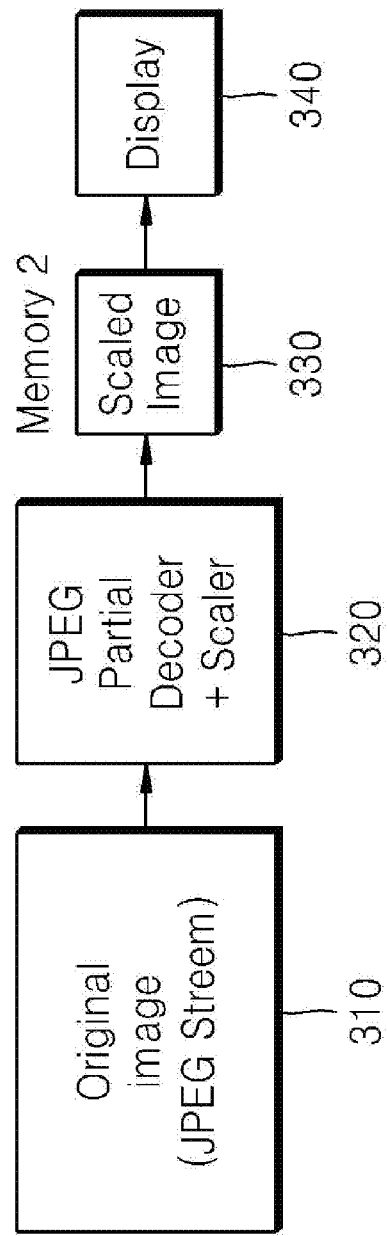
FIG. 3 illustrates another exemplary embodiment of an arrangement for decoding and scaling a JPEG image for display.

To address this shortcoming, FIG. 3 illustrates another exemplary embodiment of an arrangement 300 for decoding and scaling a JPEG image for display. FIG. 3 shows a source 310 of coded image data, a combined partial JPEG decoder & scaler 320, a memory 330, and a display device 340. In the arrangement 300, a partial JPEG decoding operation is performed in conjunction with a scaling operation. Here, a partial decoding operation means performing a decoding operation on the whole source image data, but only writing to memory the scaled decoded image data which is to be displayed on the display device 340.

Figure 4:
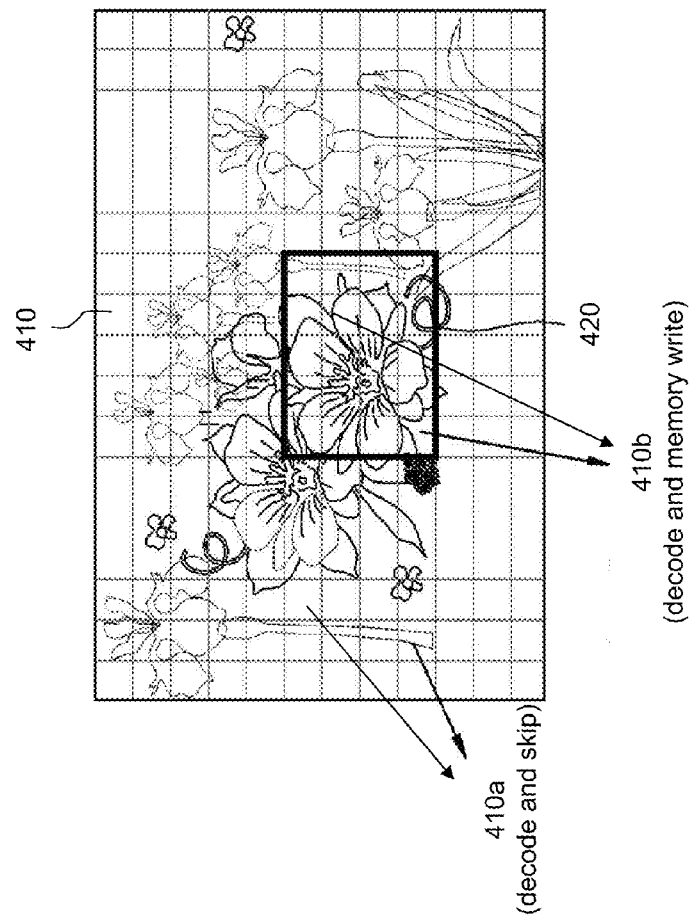
FIG. 4 illustrates an image used for explanation of a process of decoding and scaling a JPEG image for display according to one embodiment.

FIG. 4 illustrates an image 400 used for explanation of a process of decoding and scaling a JPEG image for display according to one embodiment. Image 400 is shown divided into a plurality of JPEG minimum coded units (MCUs) 410 including an area 420 that is to be zoomed and displayed on a display device. In particular, image 400 includes first MCUs 410a corresponding to areas of image 400 that are not to be zoomed and displayed on a display device, and second MCUs 410b that belong to area 420 to be zoomed and displayed on the display device.

In FIG. 4, when processing the source image data for image 400 to zoom the area 420 for display on the display device, combined partial JPEG decoder & scaler 320 partially decodes the image data for the whole image from the upper left end to the right lower end on an MCU by MCU basis. If information for the zoomed area is not detected for the MCU, then JPEG decoder & scaler 320 skips the rest of decoding process and memory write. However when information for the zoomed area 420 is detected for the MCU, then JPEG decoder & scaler 320 decodes & scales the image data included in area 420, and the decoded and scaled image data is written to the memory.

In arrangement 300, a partial decoding method is implemented by decoding & scaling in one process and writing the image data to the memory which is displayed by the display device. Accordingly, the required memory area can be reduced and a fine zoom function can be provided with reduced memory capacity.

Figure 5:
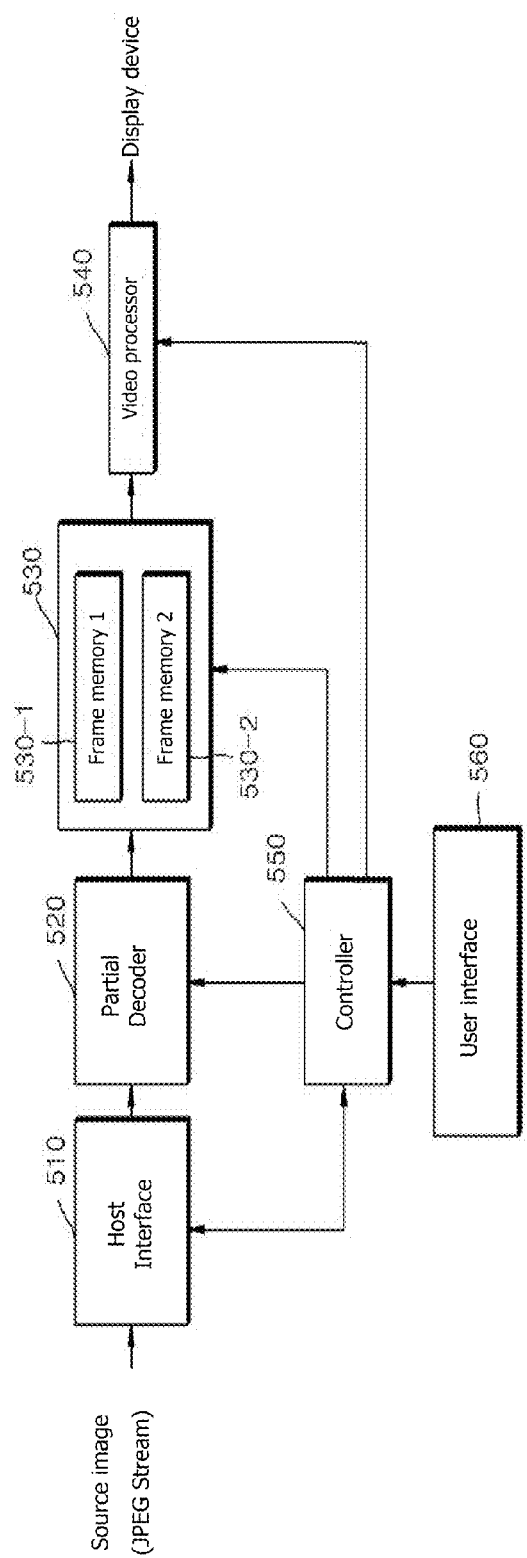
FIG. 5 illustrates a functional block diagram of one exemplary embodiment of an image data processing system for decoding and scaling a JPEG image for display.

FIG. 5 illustrates a functional block diagram of one exemplary embodiment of an image data processing system 500 for decoding and scaling a JPEG image for display. As will be appreciated by those skilled in the art, the various "parts" shown in FIG. 5 may be physically implemented using a software-controlled microprocessor & memory, hard-wired logic circuits, programmable logic devices, or a combination thereof. Also, while the parts are functionally segregated in FIG. 5 for explanation purposes, they may be combined in various ways in any physical implementation.

Image data processing system 500 includes a host interface 510, a partial decoder 520, memory 530 including a first frame memory 530-1 and a second frame memory 530-2, a video processor 540, a controller 550 and a user interface 560.

Host interface 510 exchanges data with a host (such as a host processor, not shown) and receives the source image data from the host. The source image data is an encoded still image data, beneficially a compressed still image data. In some embodiments, the compressed still image data may be JPEG-compressed image data.

Partial decoder 520 receives the source image data from host interface 510, decodes the source image data, and scales the decoded image data by a scaling ratio K based on the size of the image to be displayed and a pixel or display resolution of a target display device on which the scaled image is to be displayed. Partial decoder 520 stores the scaled imaged data to the frame buffer 530.

Further details of embodiments of partial decoder 530 will be described below in connection with FIGS. 6-9.

In frame buffer 530, first frame memory 530-1 stores the decoded & scaled data from partial decoder 520 in a general operating mode, while in a zoom mode second frame memory 530-2 stores data which is decoded corresponding to area information for partial decoding and scaling by the scale ratio K based on a zoom ratio. Frame buffer 530 may dynamically allocate memory between first and second frame memories 530-1 and 530-2 according to data storage needs.

Video processor 540 processes the data read from frame buffer 530 to fit a target display device, in detail, scaling the data to fit the display device's pixel resolution and, if needed, performs color information conversion based on the device display format.

Controller 550 controls image data processing system 500. In particular, controller 550 generates the image data information for the image size to be displayed, calculates the scale ratio K based on the display device's pixel resolution, and in a case of a zoom operation, generates partial decoding area information (P) for the image according to the zoom operation to be performed on the image.

In a beneficial arrangement, controller 550 determines the scale ratio K based on dividing the source image data size by the display device's pixel resolution and adjusting the result to be an integer ratio. For example, if the size of a block of pixels that are processed together (e.g., an MCU) is 8×8 pixels, then division ratios of 8×8, 7×7, 6×6, 5×5, 4×4, 3×3, 2×2, and 1×1 can be adopted to yield scale ratios of 64/64, 49/64, 36/64, 25/64, 16/64, 9/64, 4/64, and 1/64. These values are useful for reducing the memory requirements for image data processing system 500 and providing decoding in sizes of units of pixel blocks (e.g., MCUs).

User interface 560 receives the user select function information (ex; zoom in, zoom out) and provides this information to controller 550.

Figure 6A:
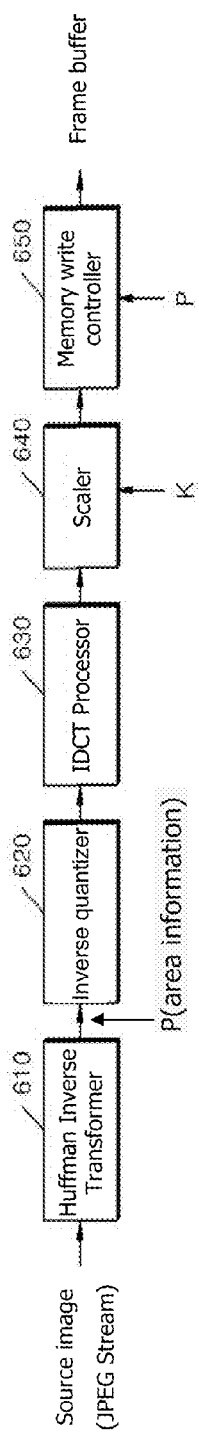
FIG. 6A illustrates a functional block diagram of a first exemplary embodiment of a partial decoder.

FIG. 6A illustrates a functional block diagram of a first exemplary embodiment of a partial decoder 600 that may be employed in image data processing system 500. Partial decoder 600 includes a Huffman inverse transformer 610, an inverse quantizer 620, an inverse discrete cosine transform (IDCT) block 630, a scaler 640, and a memory write controller 650.

Figure 6B:
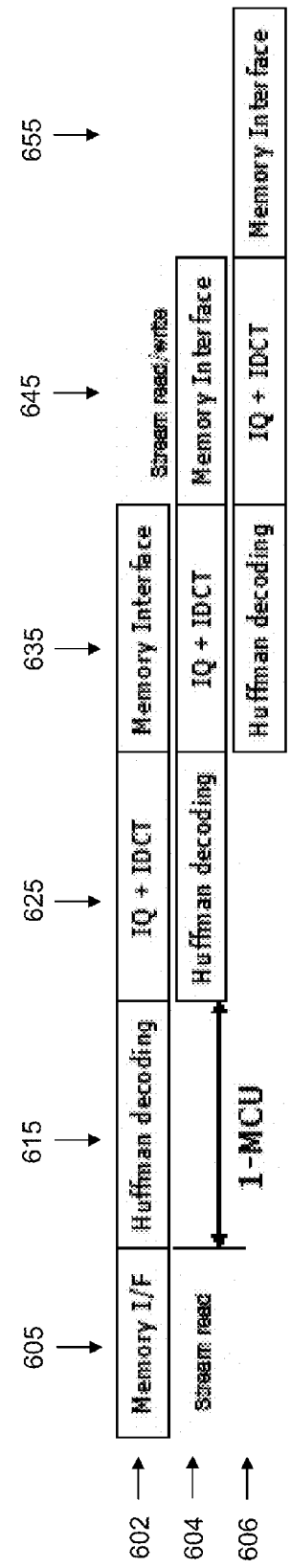
FIG. 6B illustrates timing of operations of an exemplary embodiment of a partial decoder.

FIG. 6B illustrates timing of operations of an exemplary embodiment of partial decoder 600, illustrating three pipelined operations 602, 604 and 606 for processing three corresponding pixel blocks (e.g., MCUs).

As shown in FIG. 6B, in a first period 605 in pipelined operation 602, data for the first MCU is received from a memory interface (e.g., see host interface 510 in FIG. 5).

In a second period 615, in pipelined operation 602 Huffman inverse transformer 610 performs a Huffman decoding operation on the data for the first MCU.

In a third period 625, in pipelined operation 602 inverse quantizer 620 performs an inverse quantization on the Huffman decoded data, and IDCT block 630 executes an inverse discrete cosine transform on the inverse quantized data for the first MCU. At the same time, in pipelined operation 604 Huffman inverse transformer 610 performs a Huffman decoding operation on the data for a second MCU.

Then in a fourth time period 635 scaler 640 scales the decoded data for the first MCU with the scale ratio K, and memory write controller 650 writes decoded and scaled image data to a frame buffer. Controller 550 in FIG. 5 generates the scale ratio K based on the image size and the pixel resolution of the target display device on which the scaled image will be displayed. At the same time, in pipelined operation 604 inverse quantizer 620 performs an inverse quantization on the Huffman decoded data, and IDCT block 630 executes an inverse discrete cosine transform on the inverse quantized data for the second MCU. Also at the same time, in pipelined operation 606 Huffman inverse transformer 610 performs a Huffman decoding operation on the data for a third MCU.

When a zooming operation is performed, controller 550 generates partial decoding area information "P" corresponding to the area of the image that is to be zoomed and displayed.

If the P value is inserted after the Huffman decoding operation, then the inverse quantization and IDCT procedures can be skipped for all data corresponding to areas of the image that are not to be displayed in the zoomed image (i.e., for MCUs 410*a* in FIG. 4) which can save time in the partial decoding operation. Also, only the data corresponding to the partial decoding area information P is written by memory write controller 650 in the frame controller.

Figure 7:
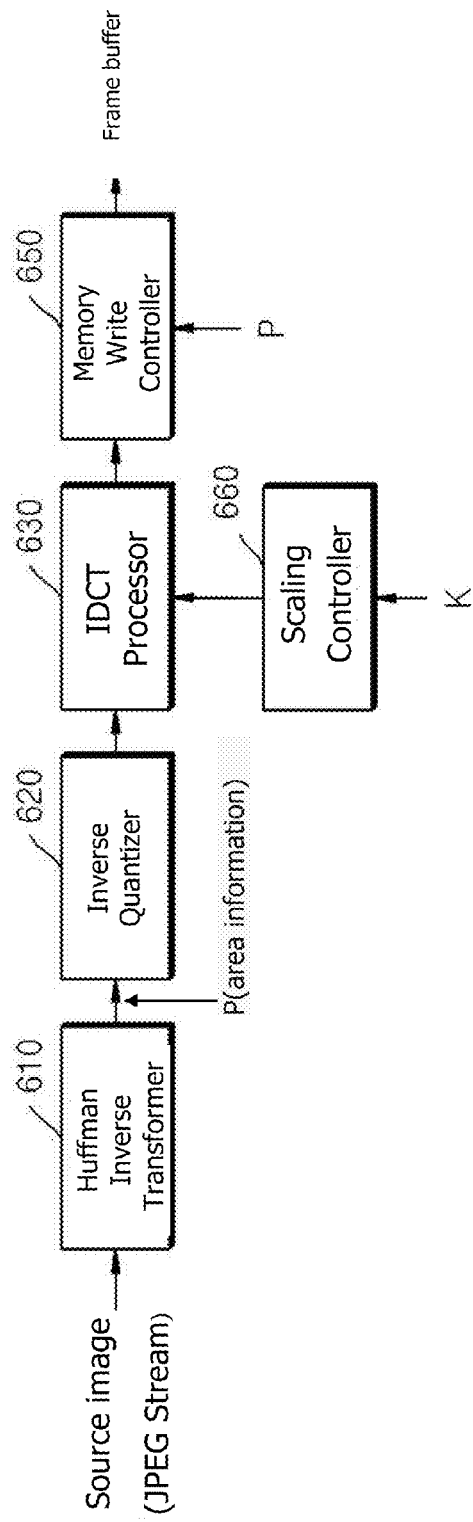
FIG. 7 illustrates a functional block diagram of a second exemplary embodiment of a partial decoder.

FIG. 7 illustrates a functional block diagram of a second exemplary embodiment of a partial decoder 700. Partial decoder 700 includes Huffman inverse transformer 610, inverse quantizer 620, inverse discrete cosine transform (IDCT) block 630, scaling controller 660, and memory write controller 650.

In partial decoder 700, inverse quantizer 620 executes an inverse quantization process on the image data in blocks of pixel units (e.g., MCUs). Beneficially, each such block or MCU includes a DC element and multiple AC elements, as illustrated in FIGS. 8A-8B.

In operation, scaling controller 660 receives the scale ratio K from controller 550, which selects the scale ratio K based on the image size and the pixel resolution of the target display device on which the image is to be displayed as explained above. In response to the selected scale ratio K, scaling controller 660 controls IDCT block 630 to select the partially decoded image data from each inverse quantized block or MCU to be further decoded.

Figures 8A, 8B:
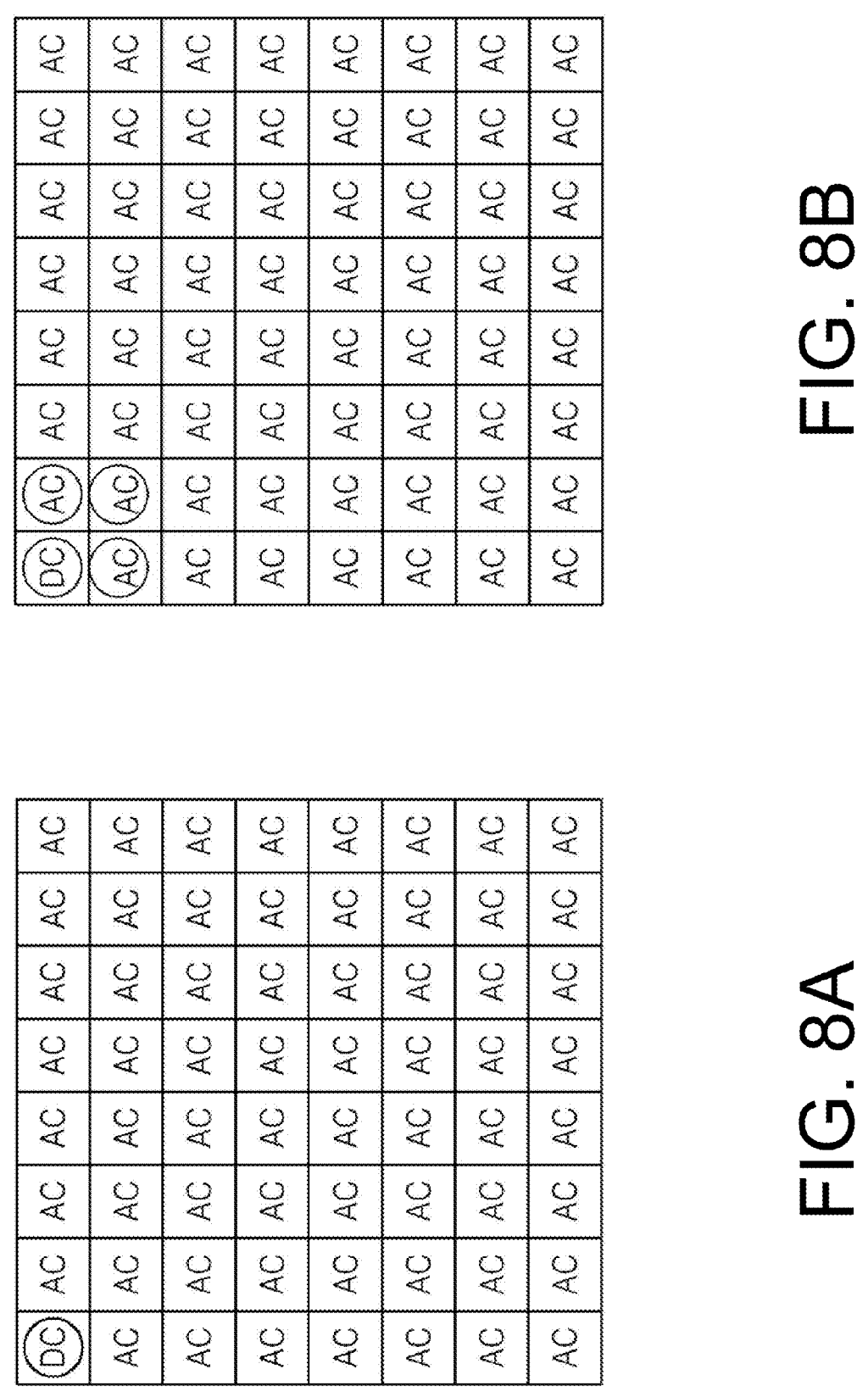

FIGS. 8A-B illustrate elements or pixels of a block or MCU that are selected for further decoding according to a selected value of a scaling factor.

As illustrated in FIG. 8A, when the scale ratio K is 1/64, then scale controller 660 extracts the DC element from the inverse quantized 8×8 block (e.g., corresponding to an MCU). As illustrated in FIG. 8B, when the scale ratio K is 4/64, then scale controller 660 extracts the DC element and 3 of the AC elements from the block.

IDCT block 630 performs the IDCT process on a block or MCU using the pixel data extracted by scaling controller 660.

Memory write controller 650 writes the scaled inverse discrete cosine transformed image data to the frame buffer.

In similarity to partial decoder 600, when a zooming operation is performed with partial decoder 700, controller 550 generates partial decoding area information "P" corresponding to the area of the image that is to be zoomed and displayed.

If the P value is inserted after the Huffman decoding operation, then the inverse quantization and IDCT procedures can be skipped for all data corresponding to areas of the image that are not to be displayed in the zoomed image (i.e., for MCUs 410*a* in FIG. 4) which can save time in the partial decoding operation. Also, only the data corresponding to the partial decoding area information P is written by memory write controller 650 in the frame controller.

Comparing the exemplary embodiments of FIG. 6A and FIG. 7, partial decoder 600 scales data that has already been inverse discrete cosine transformed by IDCT block 630, while partial decoder 700 scales the data in the IDCT process by reducing the data size in the frequency domain.

Figure 9:
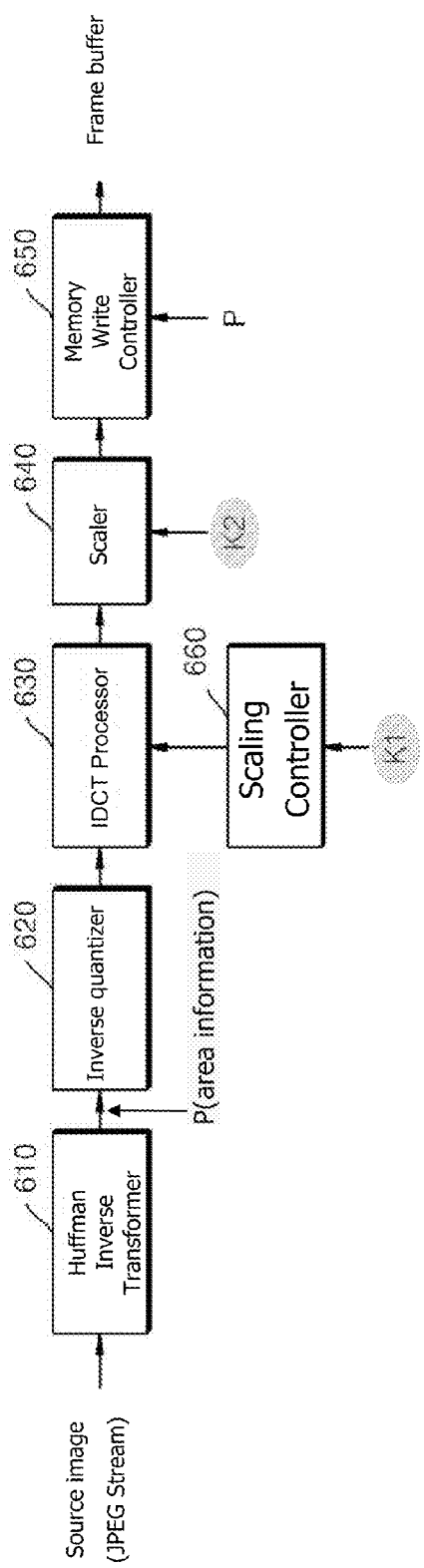
FIG. 9 illustrates a functional block diagram of a third exemplary embodiment of a partial decoder.

FIG. 9 illustrates a functional block diagram of a third exemplary embodiment of a partial decoder 900. Partial decoder 900 includes Huffman inverse transformer 610, inverse quantizer 620, inverse discrete cosine transform (IDCT) block 630, scaler 640, scaling controller 660, and memory write controller 650.

Partial decoder 900 can be thought of as an embodiment that combines the method of scaling IDCT processed data as featured in partial decoder 600, and reducing the data size in the frequency domain as featured in partial decoder 700.

Partial decoder 900 can extend the range of scaling factors and can be effectively used when the ratio of the source image pixel resolution to the device display pixel resolution is great.

In partial decoder 900, controller 550 generates a first scale ratio K1 based on a ratio of display data size to the source data, and a second scale ratio K2 of the device's display resolution to the source data. The overall scale ratio K is generated from as K=K1*K2.

Figure 10:
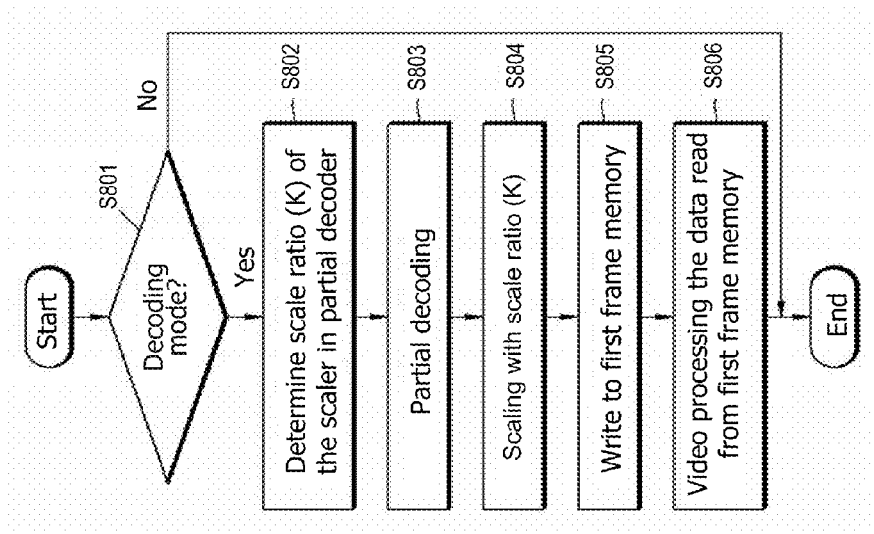
FIG. 10 illustrates a first embodiment of a method of decoding and scaling image data.

FIG. 10 illustrates a first embodiment of a method 1000 of decoding and scaling image data.

In a step S801, controller 550 checks to see if the image data processor has entered an image decode mode.

If so, then in a step S802 controller 550 determines the scale ratio K to be used for scaling by partial decoder 520.

Next, in a step S803 partial decoder 520 decodes the source image data.

In a step S804 the image data is scaled in the decoding process using the scale ratio K determined in step S802.

In a step S805, the decoded and scaled image data is written to first frame memory 530-1. Since in the example embodiment method 1000 there is no zooming of the image, first frame memory 530-1 has decoded and scaled image data.

Finally, in a step S806 video processor 540 processes the data read from first frame memory 530-1, formats the data for the target device display format, and sends the formatted data to the target display device.

Figure 11:
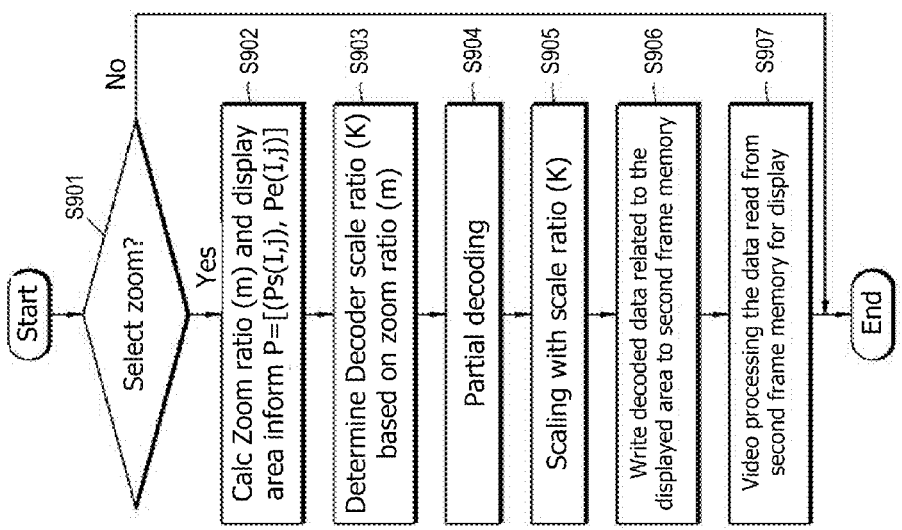
FIG. 11 illustrates a first embodiment of a method of decoding and zooming image data.

FIG. 11 illustrates a first embodiment of a method 1100 of decoding and zooming image data.

In a step S901, controller 550 checks to determine whether the zoom function has been selected via user interface 560.

If so, then in a step S902 controller 550 generates a zoom ratio (m) and partial decoding area information (P) for displaying the zoomed image data. Beneficially, the partial decoding area information P is presented by left upper end information Ps(i,j) and right lower end information Pe(i,j) that together define the boundaries of the zoomed area to be displayed (e.g., area 420 in FIG. 4).

In a step S903, controller 550 determines the scaling ratio K for scaling in partial decoder 520 based on the zoom ratio m.

Next, in a step S904 partial decoder 520 decodes the source image data.

In a step S905 the image data is scaled in the decoding process using the scale ratio K determined in step S904.

In a step S906, the decoded and scaled image data pertaining to the zoomed area to be displayed is written to second frame memory 530-2. Second frame memory 530-2 has decoded and scaled image data.

Finally, in a step S907 video processor 540 processes the data read from first frame memory 530-1, formats the data for the target device display format, and sends the formatted data to the target display device. So second frame memory 530-2 has decoded and scaled image data for the zoomed area of the image that is to be displayed.

In the method 1100, the processes of selecting a zoom, partial decoding, and scaling are coupled, fine zoomed data for a long vertical image can be picked out while employing a small capacity memory.

Figure 12:
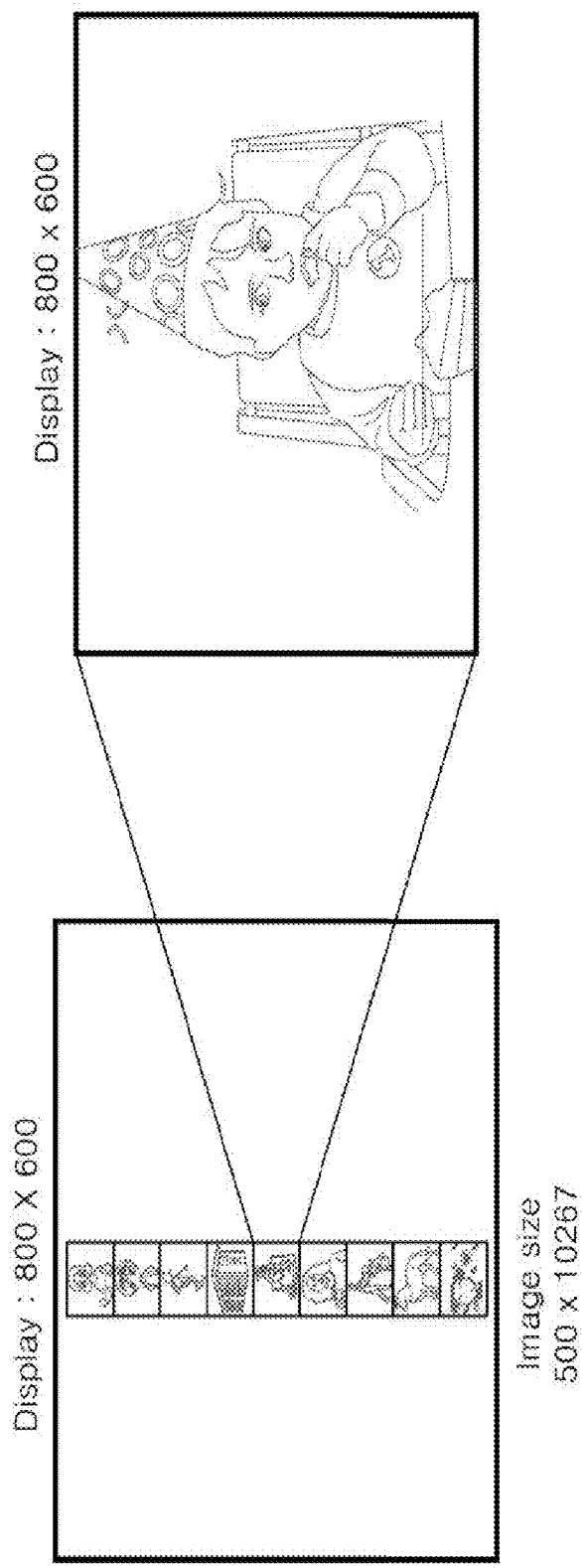
FIG. 12 illustrates an operation of scaling and zooming an image for display.

FIG. 12 illustrates an operation of scaling and zooming an image for display. In particular, the image on the left side of FIG. 12 illustrates how a long vertical image having a first pixel resolution of 500×10267 is scaled for display on a display device having a pixel resolution of 800×600. The image on the right side of FIG. 12 illustrates how a small portion of the long vertical image is zoomed in for display on the display device at the same pixel resolution of 800×600 for a fine zoom resolution.

Figure 13:
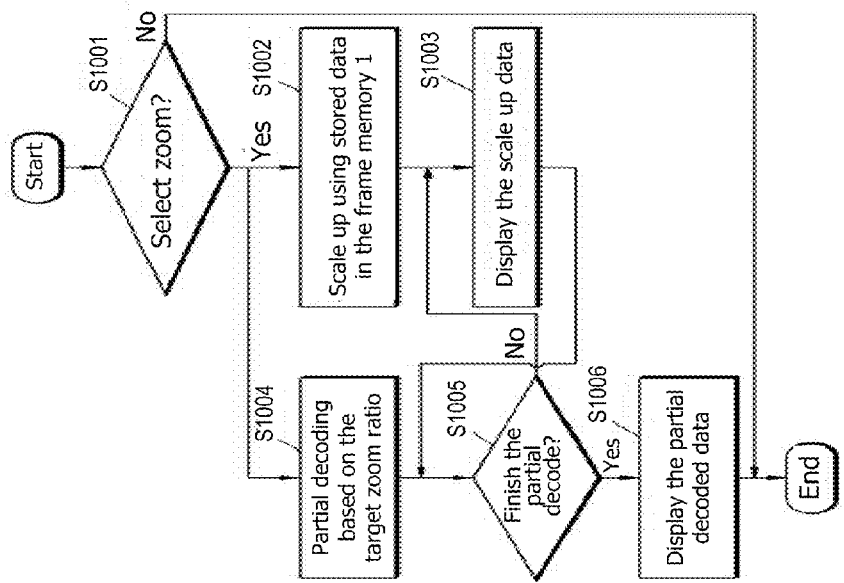
FIG. 13 illustrates a second embodiment of a method of decoding and zooming image data.

FIG. 13 illustrates a second embodiment of a method 1300 of decoding and zooming image data.

In a step S1001, controller 550 checks to determine whether the zoom function has been selected via user interface 560.

If so, then in a step S1004 partial decoder 520 performs a partial decoding operation using the target zoom ratio zoom ratio m and partial decoding area information P for displaying the zoomed image data generated by controller 550. Beneficially, the step S1004 includes the operations of steps S902 through S906 of method 1100 shown in FIG. 11.

While step S1004 is being executed, controller 550 controls video processor 540 to scale-up the data read from first frame memory 530-1 using the zoom ratio m. This scale up process uses simple interpolation, so it requires less time than the partial decoding operation of step S1004.

In a step S1003, controller 550 controls video processor 540 to output the scaled up data to the target display device for display.

In a step S1005, the process checks to see whether or not the partial decoding of step S1004 is completed.

If the partial decoding of step S1004 is finished, then in step S1006, the new partial decoded data selected by the zoom function is displayed by the display device.

In method 1300, when the zoom function is selected, the image data processing system outputs a low quality zoomed image using stored data in first frame buffer 530-1 by simple interpolation for a fast response. For displaying a higher quality zoomed image, the new partial decoding process with the zoom operation is executed in parallel with displaying the lower-quality interpolated image, and when the partial decoding process is complete, the output data of the partial decoding operation in second frame buffer 530-2 is displayed to produce a high quality zoomed image.

Figure 14:
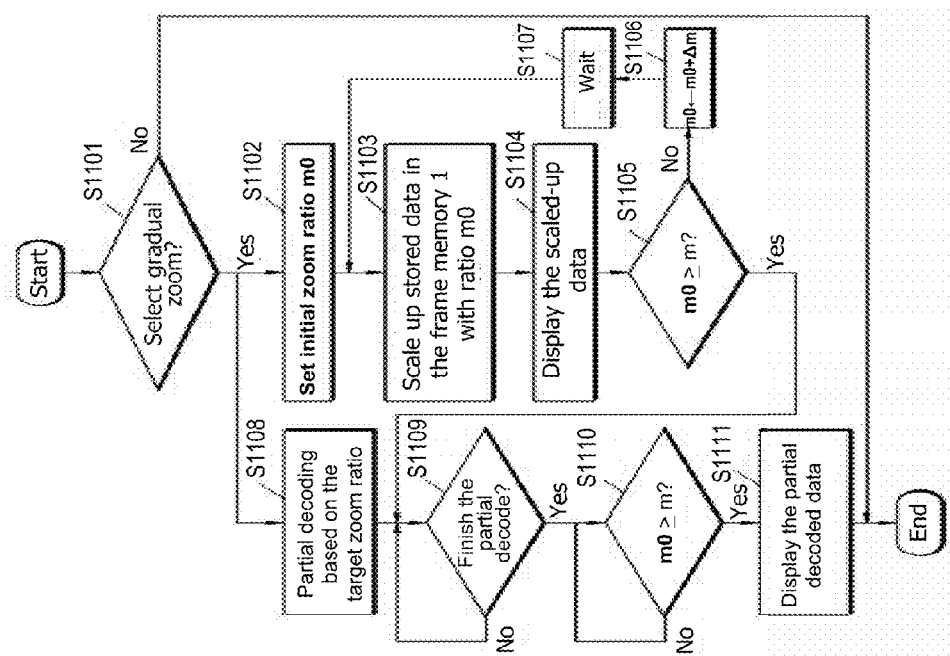
FIG. 14 illustrates a third embodiment of a method of decoding and zooming image data.

FIG. 14 illustrates a third embodiment of a method 1400 of decoding and zooming image data.

In a step S1101, controller 550 checks to determine whether the zoom function has been selected via user interface 560.

If so, then in a step S1108 partial decoder 520 performs a partial decoding operation using the target zoom ratio zoom ratio m and partial decoding area information P for displaying the zoomed image data generated by controller 550. Beneficially, the step S1108 includes the operations of steps S902 through S906 of method 1100 shown in FIG. 11.

While step S1108 is being executed, in a step S1102 controller 550 sets an initial zoom ratio m0 to be employed in the gradual zoom process.

Then in a step S1103, controller 550 controls video processor 540 to scale up the data read from first frame memory 530-1 with the zoom ratio m0.

In a step S1104, controller 550 controls video processor 540 to output the scaled up data to the display device.

In a step S1105, controller 550 checks to determine whether the zoom ratio m0 is equal to the target zoom ratio m.

If the zoom ratio m0 is not equal to the target zoom ratio m in the gradual zooming process, then in step S1106 controller 550 increments zoom ratio m0 by a zoom ratio incremental unit $\Delta$ m.

Then in a step S1107, the process waits a predetermined time, and then returns to execute the step S1103 again with the new zoom ratio m0 calculated in step S1106, and the process repeats as before.

When the target ratio m0 reaches the target zoom ratio m, then in step S1109 controller 550 checks to see whether or not the partial decoding of step S1108 is completed using the zoom ratio m.

When the partial decoding operation is completed with the zoom ratio m, then in step S1110 controller 550 checks to determine whether the zoom ratio m0 is equal to the target zoom ratio m.

If so, then in step S1111, the new partial decoded data selected by the zoom function is displayed by the display device.

In method 1400, when a gradual zoom function is selected, the image data processing system outputs a low quality zoomed image using stored data in the frame buffer with a gradually increasing zoom ratio by simple interpolation for a fast response. For displaying a higher quality zoomed image, the new partial decoding process with the zoom operation is executed in parallel with displaying the lower-quality interpolated image, and when the partial decoding process is complete, the output data of the partial decoding operation in the second frame buffer is displayed to produce a high quality zoomed image.

Figure 15:
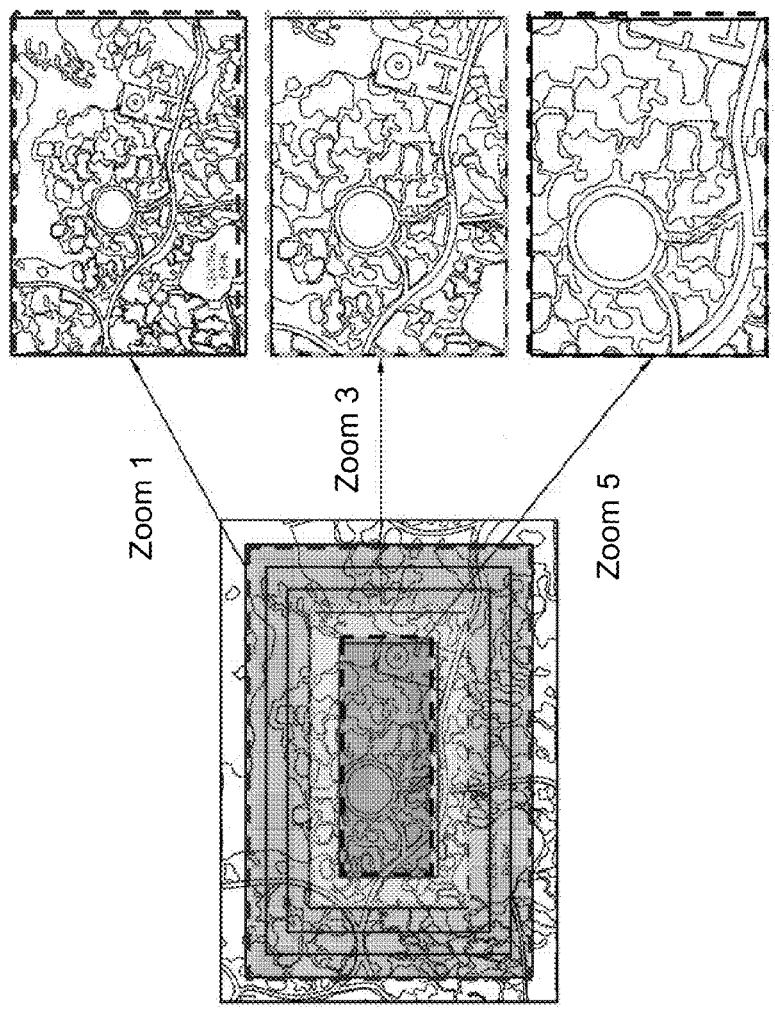
FIG. 15 illustrates an operation of gradually zooming an image for display.

FIG. 15 illustrates an operation of gradually zooming an image for display. In the example illustrated in FIG. 15, image data processing system 500 implements a gradual zoom function by outputting stored image data in the first frame buffer by simple interpolation with the gradual zoom ratios 1×, 3×, and 5× to provide a fast response. Then image data processing system 500 outputs data of the partial decoding operation in the second frame buffer to produce a high quality zoomed image at the final 5× ratio.

Although for illustration purposes concrete examples are described above in connection with processing JPEG compressed images, it should be understood that various principles, systems, and/or methods described above may be applied, as appropriate, to images encoded with other encoding or compression formats or standards.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A device, comprising:
 a controller configured to receive information for displaying at least a portion of an image, and in response thereto to generate a scale ratio K for scaling compressed image data corresponding to the image;
 a partial image decoder configured to receive the compressed image data and the scale ratio and in response thereto to decode and scale the compressed image data by the scale ratio K and to output a portion of the decoded and scaled image data, wherein the portion corresponds to an area of the image to be displayed on a display device;
 a frame buffer configured to store the portion of the decoded and scaled image data output by the partial image decoder; and
 a video processor configured to receive the data from the frame buffer and to further scale the data for display on the display device,
 wherein the controller is further configured to receive control information for zooming the image for display on the display device, and in response thereto, to generate partial decoding area information identifying a zoomed area of the image that is to be displayed, and wherein the partial decoder is configured to only partially decode compressed image data corresponding to areas of the image that are not included in the zoomed area, and to fully decode compressed image data corresponding to the zoomed area and to write the fully decoded image data for the zoomed area into the frame buffer, wherein the controller is configured to generate the scale ratio based on the zoom area and a display resolution of the display device.

2. The device of claim 1, wherein the compressed image data is encoded in minimum coded units (MCUs) of (N*N) pixels, and wherein the scale ratio $$K = \frac{M*M}{N*N},$$

where M and N are integers, and where M<N.

3. The device of claim 1, wherein the compressed image data is encoded in minimum coded units (MCUs), and wherein the partial decoder comprises:
   a Huffman decoder configured to decode each MCU of the compressed image data to produce partially decoded image data;
   an inverse quantizer, inverse discrete cosine transformer (IDCT), and scaler configured to fully decode and scale only the partially decoded image data that corresponds to the zoomed area of the image; and
   a memory write controller configured to write the fully decoded image data for the zoomed area into the frame buffer.

4. The device of claim 1, wherein the compressed image data is encoded in minimum coded units (MCUs), and wherein the partial decoder comprises:
   a Huffman decoder configured to decode each MCU of the compressed image data to produce partially decoded image data;
   an inverse quantizer and inverse discrete cosine transformer (IDCT) configured to fully decode and scale only the partially decoded image data corresponding to the zoomed area;
   a scaling controller configured to control the IDCT to scale the partially decoded image data by reducing the data size in the frequency domain; and
   a memory write controller configured to write the fully decoded image data for the zoomed area into the frame buffer.

5. The device of claim 4, wherein the compressed image data is encoded in MCUs of (N*N) pixels, and wherein the scale ratio $$K = \frac{M*M}{N*N},$$

where M and N are integers, and where M<N.

6. The device of claim 5, wherein the IDCT reduces the data size for zooming the image by extracting a total of M*M DC and AC elements of an inverse quantized MCU block output by the inverse quantizer.

7. The device of claim 1, wherein the compressed image data is encoded in minimum coded units (MCUs), and wherein the partial decoder comprises:
   a Huffman decoder configured to decode each MCU of the compressed image data to produce partially decoded image data;
   an inverse quantizer, inverse discrete cosine transformer (IDCT), and scaler configured to fully decode and scale only the partially decoded image data that corresponds to the zoomed area of the image;
   a scaling controller configured to control the IDCT to scale the partially decoded image data by reducing the data size in the frequency domain; and
   a memory write controller configured to write the fully decoded image data for the zoomed area into the frame buffer,
   wherein the scaling controller applies a scale factor of K1 and the scaler applies a scale factor of K2, where K1*K2=K.

8. The device of claim 1, wherein the compressed image data is encoded in minimum coded units (MCUs), and wherein the partial decoder comprises:
   a Huffman decoder configured to decode each MCU of the compressed image data to produce partially decoded image data;
   an inverse quantizer, inverse discrete cosine transformer (IDCT), and scaler configured to fully decode and scale the partially decoded image data; and
   a memory write controller configured to write the portion of the fully decoded image data into the frame buffer.

9. The device of claim 1, wherein the compressed image data is encoded in minimum coded units (MCUs), and wherein the partial decoder comprises:
   a Huffman decoder configured to decode each MCU of the compressed image data to produce partially decoded image data;
   an inverse quantizer and inverse discrete cosine transformer (IDCT) configured to fully decode and scale the partially decoded image data;
   a scaling controller configured to control the IDCT to scale the partially decoded image data by reducing the data size in the frequency domain; and
   a memory write controller configured to write the portion of the fully decoded image data into the frame buffer.

10. The device of claim 1, wherein the compressed image data is encoded in minimum coded units (MCUs), and wherein the partial decoder comprises:
    a Huffman decoder configured to decode each MCU of the compressed image data to produce partially decoded image data;
    an inverse quantizer, inverse discrete cosine transformer (IDCT), and scaler configured to fully decode and scale the partially decoded image data;
    a scaling controller configured to control the IDCT to scale the partially decoded image data by reducing the data size in the frequency domain; and
    a memory write controller configured to write the portion of the fully decoded image data into the frame buffer,
    wherein the scaling controller applies a scale factor of K1 and the scaler applies a scale factor of K2, where K1*K2=K.

11. The device of claim 1, further comprising:
    the display device; and
    a user interface configured to receive one or more user selections for displaying the image on the display device and in response thereto to provide at least some of the information to the controller.

12. The device of claim 1, wherein the device further comprises a wireless communication transceiver.

13. The device of claim 1, wherein the device further comprises a digital photo frame.

14. A method, comprising:
receiving information for displaying at least a portion of an image, and in response thereto, generating a scale ratio K for scaling compressed image data corresponding to the image;
partially decoding the compressed image data;
fully decoding at least a portion of the partially decoded image data, wherein the portion corresponds to an area of the image to be displayed on a display device;
scaling the fully decoded image data by the scale ratio K;
writing the portion of the decoded and scaled image data into a frame buffer; and
video processing the data from the frame buffer and to further scale the data for display on the display device,
the scale ratio determined based on a zoom ratio of the image to be displayed and a display resolution of the display device.

15. The method of claim 14, wherein the compressed image data is encoded in minimum coded units (MCUs) of (N*N) pixels, and wherein the scale ratio $$K = \frac{M*M}{N*N},$$

scale ratio where M and N are integers, and where M<N.

16. A method, comprising:
receiving information for displaying at least a portion of an image, including information identifying a zoom function to be performed on the image;
determining a zoomed area of the image to be displayed and a zoom ratio for the image;
generating a scale ratio K for scaling compressed image data corresponding to the image;
partially decoding the compressed image data;
fully decoding at least a portion of the partially decoded image data, wherein the portion corresponds to the zoomed area;
scaling the fully decoded image data by the scale ratio K;
writing the portion of the decoded and scaled image data into a frame buffer; and
video processing the data from the frame buffer to further scale the data for display on the display device,
wherein the scale ratio K is generated based on the zoom ratio of the image to be displayed and a display resolution of the display device.

17. A method, comprising:
receiving information for displaying at least a portion of an image, including information identifying a zoom function to be performed on the image;
determining a zoomed area of the image to be displayed and a zoom ratio for the image;
generating a scale ratio k, based on the zoom ratio, for scaling compressed image data corresponding to the image;
(a) partially decoding the compressed image data;
(b) fully decoding at least a portion of the partially decoded image data, wherein the portion corresponds to the zoomed area;
(c) scaling the fully decoded image data by the scale ratio K;
(d) writing the portion of the decoded and scaled image data into a first frame buffer;
further comprising,
until step (d) is completed for the entire image, in parallel with steps (a)-(d):
(e) storing fully decoded image data for the entire image in a second frame buffer;
(f) scaling-up the fully decoded image data of the second frame buffer by interpolation, and
(g) displaying the scaled-up image data, and
when step (d) is completed for the entire image, stopping displaying the scaled-up image data from the second frame buffer, and instead displaying the decoded and scaled image data from the first frame buffer.

18. A method, comprising:
receiving information for displaying at least a portion of an image, including information identifying a zoom function to be performed on the image;
determining a zoomed area of the image to be displayed and a zoom ratio in for the image;
generating a scale ratio K, based on the zoom ratio m, for scaling compressed image data corresponding to the image;
(a) partially decoding the compressed image data;
(b) fully decoding at least a portion of the partially decoded image data, wherein the portion corresponds to the zoomed area;
(c) scaling the fully decoded image data by the scale ratio K;
(d) writing the portion of the decoded and scaled image data into a first frame buffer;
further comprising,
until step (d) is completed for the entire image, in parallel with steps (a)-(d):
(e) storing fully decoded image data for the entire image in a second frame buffer;
(f) scaling-up the fully decoded image data of the second frame buffer by interpolation using a zoom ratio m0, wherein initially n0<m, and
(g) displaying the scaled-up image data,
(h) determining whether m0<m, and when m0<m:
(i) incrementing the zoom ratio m0 by Δm,
(j) waiting a wait time, and
(k) repeating steps (f)-(h);
and
when step (d) is completed for the entire image and m0>m, stopping displaying the scaled-up image data from the second frame buffer, and instead displaying the decoded and scaled image data from the first frame buffer.

* * * * *